May 27, 1952   H. E. CHURCHILL ET AL   2,597,921
TORQUE CONVERTER AND LOCKUP MEANS THEREFOR
Filed May 31, 1946   3 Sheets-Sheet 1

INVENTOR.
BY Harold E. Churchill and Woodrow A. Nasbany
ATTORNEYS.

May 27, 1952 H. E. CHURCHILL ET AL 2,597,921
TORQUE CONVERTER AND LOCKUP MEANS THEREFOR
Filed May 31, 1946 3 Sheets-Sheet 2
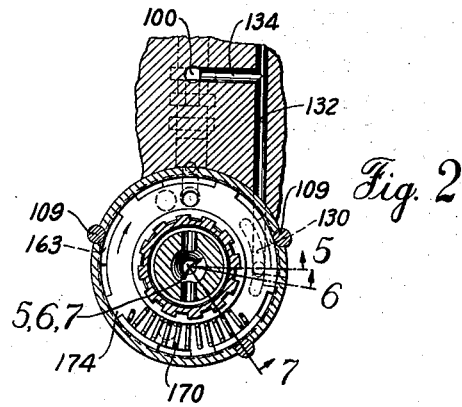
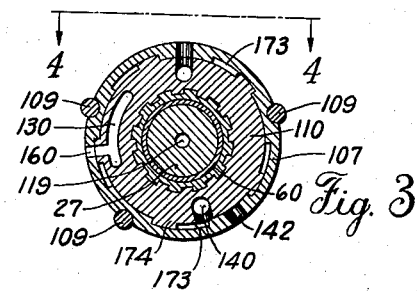
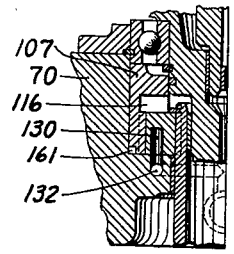
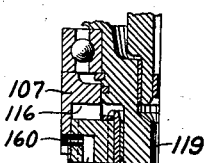
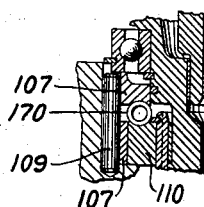
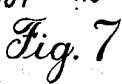
INVENTOR.
Harold E. Churchill and Woodrow A. Hasbany
BY
ATTORNEYS.

May 27, 1952   H. E. CHURCHILL ET AL   2,597,921
TORQUE CONVERTER AND LOCKUP MEANS THEREFOR
Filed May 31, 1946   3 Sheets-Sheet 3

INVENTOR.
Harold E. Churchill and Woodrow S. Nasbanz
BY
Brown, Jackson, Boettcher & Dienner
ATTORNEYS.

Patented May 27, 1952

2,597,921

UNITED STATES PATENT OFFICE 2,597,921

TORQUE CONVERTER AND LOCKUP MEANS THEREFOR

Harold E. Churchill and Woodrow A. Hasbany, South Bend, Ind., assignors to The Studebaker Corporation, South Bend, Ind., a corporation of Delaware Application May 31, 1946, Serial No. 673,491

17 Claims. (Cl. 192—.07)

Our present invention relates to an improvement in a fluid torque converter having means under the control of the stator element or member of the converter for effecting automatic locking up of the drive or pump member and the turbine or driven member when these latter members are rotating at substantially the same speed, and under which condition torque multiplication through the torque converter has ceased.

Torque converters are now well known in the art and comprise a centrifugal pump or impeller element connected to the engine shaft, a hydraulic turbine or rotor element connected to the secondary or driven shaft, and a stator or reaction element connected in one direction of rotation to the case of the device for effecting imparting of drive through fluid within the converter from the pump to the turbine. The prime function of such a torque converter is to get infinitely variable torque multiplication automatically, starting with maximum multiplication and diminishing to engine torque when the driven shaft speed approaches the crank shaft or engine shaft speed. When torque is being multiplied, the pump or impeller member is rotating in the same direction as the engine crank shaft, and the stator or reaction element of the converter tends to rotate in the opposite direction, but, as is known, a one way brake is provided to hold the stator to the case which is effective to increase the torque, and effect rotation of the turbine or rotor element in the same direction as the pump or impeller element and the crank shaft of the engine. As the turbine or rotor element of the torque converter increases in speed, torque amplification gradually diminishes until such time as the speed of the turbine or rotor element and the pump or impeller element become substantially the same so that the torque output becomes that of the engine. At this point, the stator no longer takes any reaction through the case, but reverses its direction and starts to rotate in the same direction as the turbine or rotor, and the pump or impeller with some lag in speed due to hydraulic and mechanical friction of the torque converter unit. When this condition occurs it is desirable to provide for locking up of the turbine or rotor element and the pump or impeller element together because under such conditions the converter has completed its useful work and merely becomes a fluid coupling of not particularly good efficiency.

As has been noted the stator will tend to rotate in the opposite direction if permitted to do so when torque is being multiplied and reverses its direction when torque multiplication ceases so that by harnessing this movement of the reactor element it may be made to function as the governing means to bring about an automatic lock-up between the turbine and rotor element and the pump or impeller element of the torque converter thus greatly increasing the efficiency of the drive.

It is therefore an object of our invention to provide a fluid torque converter having means operable by the stator or reaction element of the torque converter to effect an automatic lock-up between the pump or impeller and the turbine or rotor elements of the converter.

In order to accomplish the aforesaid object, we propose to provide a torque converter having known fluid pump means adapted to be driven by the pump or impeller element to provide a source of fluid under pressure, and fluid pressure responsive clutch means disposed between the pump and turbine members of the torque converter adapted to be actuated or engaged by fluid under pressure to effect a lock-up between the latter two members. In the preferred form of our invention we provide a rotary valve carried by a stator shaft to which the stator of the converter has connection and which functions as a control valve for locking up the converter. Further, an accelerator valve means is also provided and is arranged so that it may be actuated to over-rule the rotary valve associated with the stator of the torque converter.

The rotary valve is allowed to float angularly in an amount sufficient to direct pressure to the aforesaid clutch means of the torque converter, or to block the fluid under pressure delivered from the fluid pump means driven by the torque converter and effect bleeding of the clutch means under the control of the stator of the torque converter. Preferably although not necessarily, spring loaded ball detent means is associated with the rotary valve to insure snap movement from one to the other of its positions under the control of the stator. Also, preferably, preloaded spring means is associated with the rotary valve to effect locking up of the torque converter at a predetermined time just prior to the time at which the stator by it movement would indicate that a lock-up between the drive and driven members of the torque converter is desirable. The latter spring means thus serves the purposes of overcoming the lag that is inherent in the stator and bringing about the most efficient drive at the earliest possible time.

A preferred feature of our invention is to provide for actuation of the aforementioned accelerator valve means by depression of the accelerator pedal of the vehicle in starting the engine of the latter, and which movement of the accelerator valve in a downshift position to effect bleed of the hydraulically operable clutch means between the pump or impeller member and the turbine or rotor member of the torque converter which is the desired condition in the starting of a vehicle.

A further preferred feature of our invention is to provide detent means for normally maintaining the accelerator valve in its downshift position so that it is adapted to be maintained in this position independent of subsequent movement of the accelerator pedal.

A further preferred feature is to provide an arrangement of the accelerator valve with the rotary valve controlled by the stator of the torque converter to maintain the accelerator valve in its downshift position, and the clutch means between the pump or impeller member and turbine or rotor member of the torque converter disengaged while the stator is taking the reaction to the case of the torque converter unit.

A further preferred feature is to provide for the rotation of the rotary valve under the control of the stator of the torque converter to direct fluid under pressure delivered by the fluid pump means driven by the pump or impeller member of the torque converter to the accelerator valve to shift the latter from its downshift position to its lock-up position, in which latter position the accelerator valve permits the delivery of fluid under pressure to the clutch means between the pump or impeller member and the turbine or rotor member of the torque converter to engage the same and effect a lock-up between these members.

A further preferred feature is to provide for maintaining the pump or impeller member and turbine or rotor member in lock-up relation as last aforesaid until the accelerator means is actuated manually by manipulation of the accelerator pedal regardless of speed or torque demands, thus assuring direct engine drive at lower speeds with no hunting conditions in the cycle.

A further preferred feature is to provide for release of the lock-up last referred to by depressing the accelerator pedal to thereby shift the accelerator valve to its downshift position which blocks the delivery of pressure to the clutch means between the pump or impeller member, and turbine or rotor member of the torque converter, and exhausts the clutch piston chamber of the clutch means to unlock the torque converter.

The arrangement of parts above referred to is such that if a torque demand exists upon the movement of the accelerator valve to its downshift position, there will be a differential speed between the turbine or rotor member and the pump or impeller member giving torque multiplication in the ratio of the differential in speed. Under these conditions, the stator will reverse its direction to take the reaction to the case of the torque converter, and which effects movement of the rotary or control valve to its unlocked position thus keeping the converter unlocked to get torque multiplication. From this point on the cycle is repeated as above described to re-establish a lock-up between the drive and driven elements of the torque converter. However, under the conditions last assumed if a torque demand does not exist at the time of downshifting of the accelerator valve, there will be no substantial difference in speed between the turbine or rotor element, and the pump or impeller element and the converter would automatically lock-up again as soon as the accelerator pedal is retracted from its fully depressed position releasing the accelerator valve.

The above and other objects, features and advantages of our invention will appear in the detailed description.

Now in order to acquaint those skilled in the art with the manner of constructing and utilizing torque converters in accordance with our present invention, we shall describe in connection with the accompanying drawings a preferred embodiment of our invention.

In the drawings:

Figure 2 is a detail vertical sectional view taken substantially on line 2—2 of Figure 1 looking in the direction indicated by the arrows;

Figure 3 is a detail vertical sectional view taken substantially on line 3—3 of Figure 1 looking in the direction indicated by the arrows;

Figure 4 is a plan view of the parts shown in Figure 3 taken substantially on line 4—4 of Figure 3 looking in the direction indicated by the arrows;

Figure 5 is a detail horizontal sectional view taken substantially on the line 5—5 of Figure 2 looking in the direction indicated by the arrows;

Figure 6 is a detail partial sectional view taken substantially on line 6—6 of Figure 2 looking in the direction indicated by the arrows;

Figure 7 is a detail sectional view taken substantially on line 7—7 of Figure 2 looking in the direction indicated by the arrows;

Figure 1:
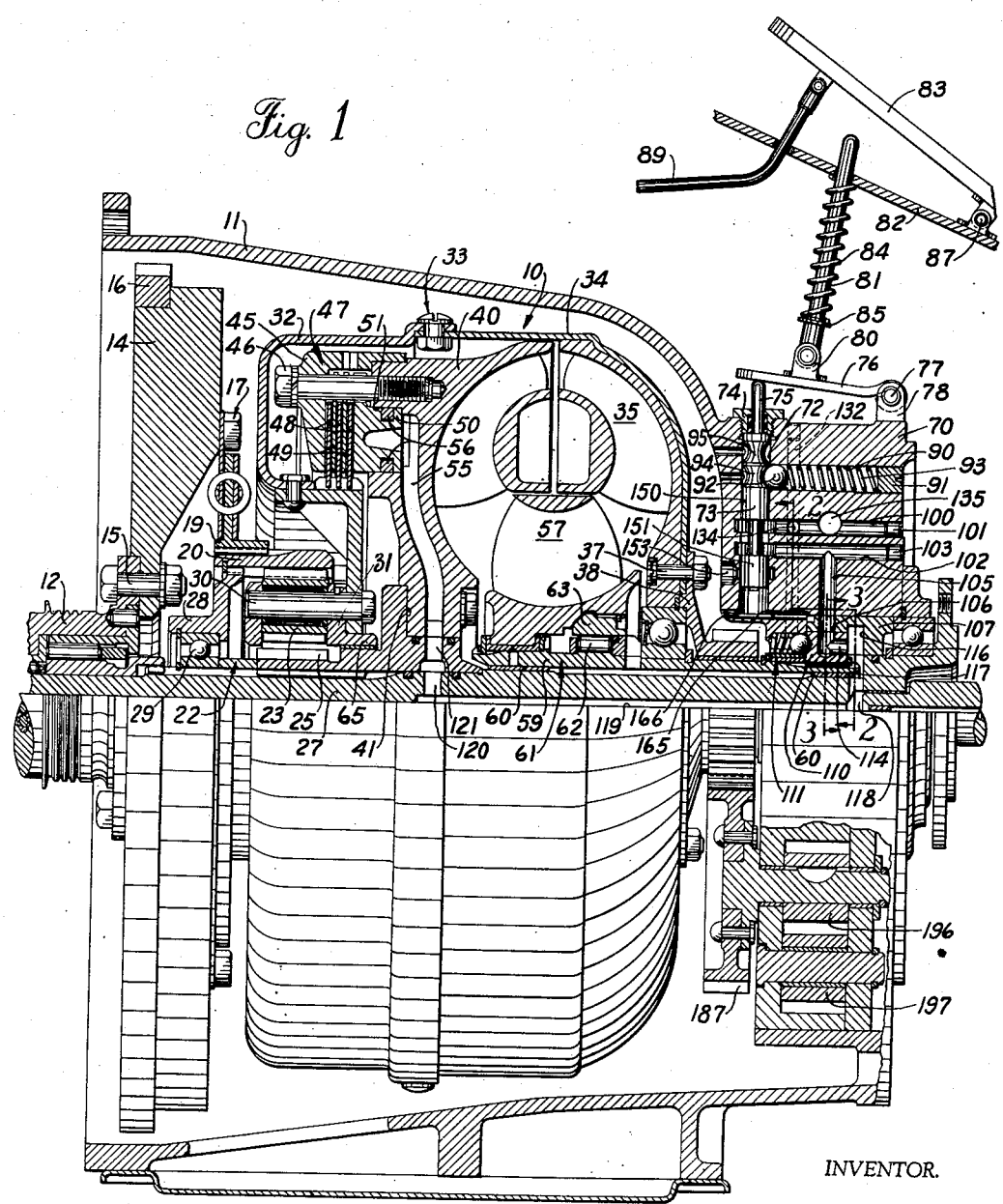
Figure 1 is a detail vertical sectional view with certain parts being shown in elevation of a torque converter constructed in accordance with our present invention.

Referring now to Figure 1 of the drawings, we have shown our invention embodied in a torque converter 10 contained within a transmission housing or casing 11. A drive or input shaft 12 which in the present disclosure is the crank shaft of an engine (not shown) has a fly wheel 14 of conventional construction suitably secured thereto as by a plurality of nuts and bolts one of which being shown at 15 and which fly wheel is provided with a conventional form of starter ring member 16. Vibration dampening means 17 of known and conventional construction is associated with the fly wheel 14 and comprises in part a sleeve or hub portion 19 having splined connection with a ring gear member 20 of a planetary gear mechanism 22. The planetary gear mechanism 22 is of conventional construction and comprises dual planet pinions one of which is shown at 23 having meshing engagement with the internal teeth of the ring gear member 20 and with second planet pinions (not shown) having meshing engagement with the planet pinions 23 and the gear teeth of the sun gear member 25 which has splined connection with the driven or output shaft 27. The ring gear member 20 is adapted to be supported by a member 28 forming part of the vibration dampening means 17 and which in turn is journaled on the driven shaft 27 by the ball bearing assembly indicated generally at 29. As previously related the vibration dampening means 17 and the planetary gear mechanism 22 are of conventional construction and form no part of our present invention. In the specific embodiment of our invention herein disclosed planet pinions 23 are journaled about pins 30 with the pins 30 being carried or mounted in a planet carrier member 31 to which one section 32 of the torque converter housing 33 is secured, and which section 32 is suitably secured to a second housing section 34. A pump or impeller member 35 of the torque converter 10 is secured to the housing section 34 as by the plurality of bolt and nut means 37 one of which is shown in Figure 1. The bolt and nut means 37 also provide for the securing to the torque converter housing of a pinion 38 for effecting driving of suitable fluid pump means to be described in greater detail hereinafter. The torque converter 10 further comprises a turbine or rotor member 40 which is suitably secured in a shouldered portion 41 formed adjacent the outer end of the sun gear member 25 in any suitable manner. The turbine or rotor member 40 has an annular clutch housing member 45 secured thereto as by plurality of bolts 46 one of which is shown in the drawing, and forming part of a friction disc clutch means 47 between the pump or impeller member 35 of the torque converter, and the turbine or rotor element 40 of the torque converter. The planet carrier member 31 provides for the support of a plurality of clutch friction discs 48 arranged alternately with respect to a plurality of clutch friction discs 49 supported at their upper ends by the bolts 46. An annular piston member 50 is mounted for axial reciprocable movement in a cylinder 51 formed in the turbine or rotor element 40. The turbine or rotor member of the torque converter 10 is further provided with a fluid passageway 55 extending to the cylinder 51 in which the annular piston member 50 is mounted and upon this passageway being charged with fluid under pressure it will be observed that the annular piston 50 will be urged to the left as viewed in the drawing to engage the friction disc plates 48 and 49 which is effective to clutch the pump or impeller member 35 of the torque converter with the turbine or rotor member 40 thereof. The means for controlling the admission of fluid under pressure into the passageway 55 of the turbine 40 will be described in greater detail hereinafter. The annular piston member 50 is further provided with piston rings 56 for preventing leakage of fluid under pressure therebeyond. As shown in the drawing the housing section 32 of the torque converter housing 33 is suitably formed to enclose the annular clutch housing member 45 connected to the turbine or driven member 40 of the torque converter 10. The torque converter 10 further comprises a stator or reaction member 57 disposed co-axially of a stator shaft 59 extending co-axially of and journalled about the driven shaft 27 upon a pair of bearing sleeves 60 disposed between the opposite ends of the stator shaft 59 and the driven shaft 27 of the transmission. A one-way brake means 61 is disposed between the stator 57 and the stator shaft 59 and in the embodiment of our invention herein disclosed is of the roller type comprising a plurality of rollers 62 one of which is shown in the drawing disposed between the cammed stator shaft 59 and a member 63 having splined connection with the stator 57 for rotation therewith. The one-way brake means 61 is arranged for preventing rotation of the stator 57 in a direction opposite the direction of rotation of the pump or drive element 35 when the torque converter unit is effecting torque multiplication between the drive or crank shaft 12 and the driven or output shaft 27. Upon the torque amplification diminishing and with the pump 35 and the turbine 40 of the torque converter coming to substantially the same speed the one-way brake means 61 no longer takes any reaction and reverses its direction of rotation as permitted by the one-way brake 61, and rotates in the same direction as the pump 35 and the turbine 40. The arrangement of a planetary gear mechanism such as that shown as at 22 together with a torque converter is known in the art and of itself forms no part of our present invention. In this connection reference may be had to Patent No. 2,224,884 dated December 17, 1940 and issued to Adolf G. Schneider and Heinrich Schneider. In this connection it will be observed that the sun gear member 25 has connection with the turbine 40 and that the planet carrier 31 of the planet pinion means of the planetary gear mechanism 22 has connection with the pump or impeller member of the torque converter with the arrangement being such that a differential drive is caused to be imparted to the pump and turbine members of the torque converter, and when the speed of rotation of the ring gear 20 and the sun gear member 25 are substantially the same the planetary gear mechanism 22 rotates as a fly wheel. Under the latter condition the drive through the torque converter is then not effected through the planetary gear mechanism which as noted will simply continue to rotate as a fly wheel. The planet carrier member 31 of the planetary gear mechanism 22 is adapted to be journaled for rotation relative to the sun gear member 25 by means of a bearing sleeve 65 disposed there between. It is to be understood that the differential drive provided by the planetary gear mechanism 22, and the torque converter unit 10 is not essential in the torque converter of our transmission.

The transmission casing or housing 11 at its outer end is provided with an elongated housing section 70 providing for the support of suitable pump and control mechanism for effecting locking up of the pump and turbine members of the torque converter as will presently appear. The housing section 70 is provided with a vertically extending bore 72 in which an accelerator valve member 73 is mounted for vertical reciprocal movement, with the open end of the bore 72 being closed by a packing nut means 74 and through which the reduced extension 75 of the accelerator valve 73 extends in sealed relation. A lever 76 is pivoted at one end at 77 in a bracket 78 at the upper end of housing section 70, and at its outer end is adapted to engage the projecting reduced end 75 of accelerator valve 73. A bracket 80 is secured intermediate the ends of the lever 76 on the upper surface thereof and pivotally supports the lower end of a rod 81 which extends through the floorboard 82 of a vehicle immediately below a throttle or accelerator pedal 83. A coil spring 84 is confined between the bottom surface of the floorboard 82 and a washer 85 adjacent the lower end of the rod member 81 for maintaining the lever 76 normally in engagement with the end of the reduced end portion 75 of the accelerator valve 73. The accelerator pedal 83 is pivoted at one end in a bracket 87 secured to the floorboard and adjacent its other end has a rod 89 pivoted thereto which extends to the carburetor for the vehicle, and operable so that upon the depression of the accelerator pedal 83 it is adapted to engage the rod 81 disposed there below to rotate the lever 76 about its pivot 77 and thereby shift the accelerator valve 73 downwardly in the bore 72 of the housing section 70. The housing section 70 is provided with a horizontally extending bore 90 closed at its outer end by the plug 91 for receiving a detent means comprising a ball element 92 normally urged into engagement with the accelerator valve 73 by the spring 93 disposed between the ball and the plug 91. The accelerator valve adjacent its upper end is provided with a pair of grooves 94 and 95, and in the position of the parts shown in the drawings the ball element 92 of the detent means is engaged in the groove 94 of the accelerator valve 73 which position of the accelerator valve for purposes of the present disclosure is termed as the lock-up position. The housing section 70 further comprises a first fluid bore 100 extending substantially horizontally and opens at its inner end into an enlarged portion of the bore 72 for the accelerator valve. At its outer end the bore 100 is closed by a plug 101. The housing section further comprises a second fluid bore 102 extending parallel with the bore 100 and is closed at its outer end by a plug 103. The bore 102 at its inner end opens into an enlarged portion of bore 72 for the accelerator valve 73. A vertically extending bore 105 extends downwardly from the bore 102 substantially centrally thereof and opens into a bore 106 formed in an annular valve housing member 107. The valve housing member 107 is retained in the housing section 70 by plurality of pins 109 shown more clearly in Figures 2 through 4 which valve housing member receives a rotary valve 110 which has splined connection with the outer end of the stator shaft 59. A spring loaded detent means 111 is associated with the rotary valve 110 the purpose of which will be described in detail hereinafter. The rotary valve 110 is provided with a passageway 114 adapted in one position thereof to be alined with bore 106 in the valve housing member 107 to direct fluid to the passageway or annular groove 116 formed in the valve housing member 107. An annular groove 117 in the driven shaft 27 adjacent its outer end connects with the groove 116 of housing 107 and a port 118 connects groove 117 with an axially extending passageway 119 interiorly of the driven shaft 27 which leads to a port having communication with an annular groove 120 formed in the sun gear member 25 and through port 121 of the latter to the passageway 55 in the turbine or rotor member 40 of the torque converter. The rotary valve 110 is also provided with a groove 130 extending inwardly of the inner face thereof, and has connection with a vertically extending bore 132 plugged at its upper end in the housing section 70. A horizontally extending bore 134 extends transversely of and intersects the bore 100 and bore 132. A second enlarged horizontally extending bore 135 extending transversely of the bore 100 and at its inner end opens into the latter. The bore 135 is adapted to have connection with the outlet of suitable pump means hereinafter referred to for delivering fluid under pressure, when the engine of the vehicle is in operation, to the passageway 100. The rotary valve 110 is further provided with a passageway 140 more clearly shown in Figures 3 and 4 and which passageway is adapted to have in one position of the rotary valve 110 communication with a bleed port 142 formed in the valve housing member 107. The purpose of these several passageways and ports will be described hereinafter.

Figure 8:
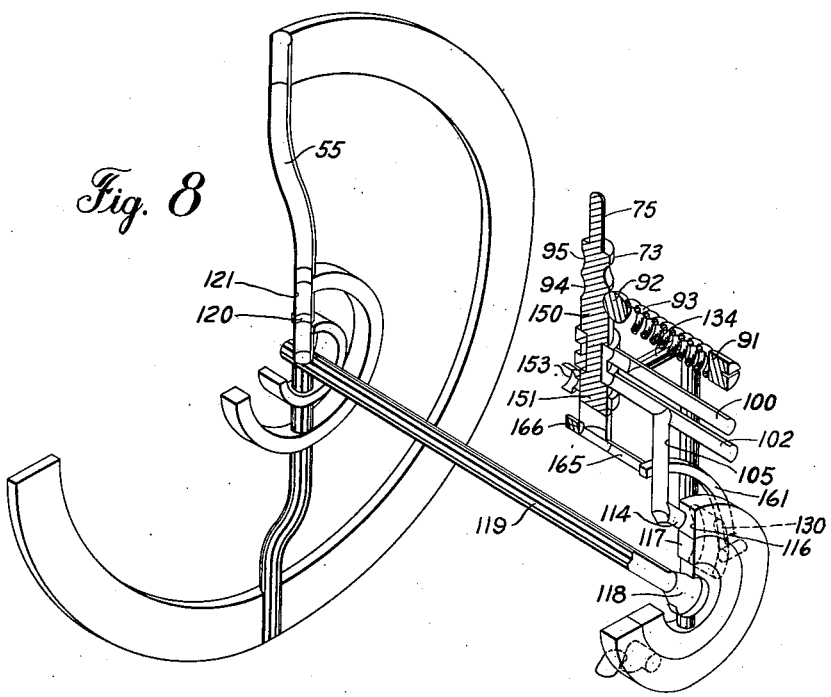
Figure 8 is a schematic perspective view illustrating the fluid passageways and valves embodied in the device of Figure 1.

Referring now more particularly to Figures 1 and 8 it will be observed that the accelerator valve 73 is provided with a first cylindrical valve portion 150 and a second cylindrical valve portion 151. In the position of the accelerator valve 73 shown in Figure 1, the valve portion 151 closes a bleed port 153 opening into the housing 11 of the transmission from the bore 72. Also it will be observed that the valve portion 150 is in a position so that the passageway 100 is in communication with the passageway 102 through the portion of the bore 72 therebetween. Fluid under pressure delivered through the bore 135 passes through the passageway 100 into the bore 72, and then into the passageway 102 and from the latter into passageway or bore 105, the port 106, the annular groove 116, annular groove 117, port 118, passageway 119, through the port between annular groove 120, the groove 120, and then port 121 into passageway 55 to effect movement of the annular piston 50 to the left, as shown in the drawing, to effect actuation or engagement of the clutch means 47 to clutch the pump 35 to the turbine 40 so that the torque converting unit rotates as a fly wheel. When the torque converter 10 is locked up, the stator 57 rotates together and in the same direction as the pump and turbine elements thereof as permitted by the free wheel unit 61 previously described. Also it will be understood that in the position of the parts last described the rotary valve 110 is in the position shown in Figures 2 through 7 in which the passageway 114 therein connects the port 106 of the valve housing 107 and the recess 116 of the latter to effect the delivery of fluid under pressure to the clutch means 47 last above described. Also in the position of the parts shown in the drawing, it will be observed that fluid under pressure is being delivered through the transversely horizontally extending port 134 to the vertically extending passageway or bore 132 and from the passageway 132 to the groove 130 extending inwardly of the inner face of the rotary valve 110 and from the latter through the port 160 formed in valve housing 107 to a passageway 161 shown more clearly in Figure 8, which is formed by the annular notch 163 at the outer periphery of the inner end of the valve housing member 107 between the pair of locking pins 109 disposed at either side of the port 160 and which passageway 161 connects with a bore 165 extending horizontally in housing section 70 to the lower end of bore 72 below the accelerator valve 73. The outer end of the bore 165 is closed by a suitable plug 166. Thus in the position of the rotary valve shown in the drawing fluid under pressure is directed below the lower end of the accelerator valve 73, and with the accelerator valve 73 in addition being retained in the position shown by the detent means comprising the ball element 92 and the coil spring 93.

In order to fully understand the mode of operation of our present invention let it be assumed that, the torque converter is locked up as last described and the vehicle in which the torque converter is incorporated is approaching an incline in which torque multiplication through the torque converter is desired. The driver, in order to effect torque multiplication through the torque converter depresses the accelerator pedal 83 fully to the floor board 82 which effects movement of the rod 81 and the lever 76 to shift the accelerator valve to a position in which the ball element 92 of the detent means engages in the downshift groove 95 to retain the accelerator valve in its downshift position. The detent is effective for maintaining the accelerator valve in this position upon release of the accelerator pedal by the driver of the vehicle to effect the desired opening and closing of the throttle of the carburetor for the engine. Now, upon multiplication of torque through the torque converter the stator is tended to be rotated in a direction opposite the direction of rotation of the pump and the turbine members which through the one-way brake 61 is effective to rotate the stator shaft 59 a limited amount to effect rotation of the rotary valve 110 in a counter-clockwise direction as viewed in Figure 3, or in a clockwise direction as viewed in Figure 2, against the force of a preloaded extension coil spring 170 one end of which is fixed to the rotary valve 110 and the other end being fixed to the housing 107 in which the rotary valve 110 is mounted for limited rotation. Also the limited rotation of the stator shaft effects movement of the rotary valve 110 against the force of the detent means 111 releasing the rotary valve 110 for such limited rotation. As shown the valve housing 107 is provided with a plurality of grooves 173 into which projections 174 formed on the periphery of the rotary valve 110 extend for limiting the relative movement of the rotary valve within the valve housing member 107. When the rotary valve 110 is rotated in the counter-clockwise direction as viewed in Figure 3 to the position limited by engagement of the projections 174 and the ends of groove 173 it will be observed that the slot 130 thereof is brought out of registry with the port 160 formed in the valve housing and that the passageway 114 is out of registry with the port 106 of the valve housing. Also in this position the passageway 140 is in registration with the bleed port 142. With the rotary valve in the position last referred to it will be observed that the passageway 55 through which fluid under pressure is adapted to effect actuation or engagement of the clutch 47 is caused to be bled through the annular groove 116, passageway 140 and thence through the bleed port 142 leading to the sump or reservoir. It will be observed that fluid under pressure is still being delivered through the bore 135 into the passageway 100 and from the latter to the horizontal transversely extending passageway 134 to the vertically extending bore 132 leading to the groove 130 in the rotary valve 110. However in the present position of the rotary valve 110 this fluid under pressure is cut off from the port 160 in the valve housing 107 so that it is not being delivered to bore 72 below the accelerator valve 73 whereby the detent means for the accelerator valve maintains the latter in its shifted position. Now as the turbine or rotor 40 increases in speed the torque amplification gradually diminishes until such time as the speed of the turbine or rotor and the pump or impeller are substantially the same so that the torque output to the driven shaft 27 becomes substantially that of the crank shaft 12 of the engine. At this point the stator 57 no longer takes any reaction to the case through the one-way brake means 61, but reverses its direction and starts to rotate in the same direction as the turbine and pump. Usually, there is some lag in speed of rotation of the reactor due to hydraulic and mechanical friction so that the preloaded extension spring 170 which as previously noted has been placed under compression is effective to advance the rotary valve 110 to position it in the position shown in the drawing. Upon the rotary valve assuming the position indicated in the drawing it will be observed that the groove 130 in the rotary valve 110 will be alined with the port 160 and which through the passageway 161 effects delivery of fluid under pressure to the passageway 165 to the bore 72 below the lower end of the accelerator valve 73 which effects shifting of the accelerator valve to the position shown in the drawing against the force of the detent means so that the ball element 92 of the detent means now engages in the groove 94 of the accelerator valve 73. When this occurs the valve portions 150 and 151 are positioned as shown in Figure 1 to effect connection of the passageway 100 with the passageway 102 whereupon fluid under pressure is delivered through the passageway previously described to the clutch means 47 to effect actuation or engagement thereof to clutch the pump or impeller 35 for rotation with the turbine or rotor 40. It will be observed that after the clutch 47 has been actuated by the delivery of fluid under pressure thereto that the torque converter will remain locked up regardless of speed or torque demands so that direct engine drive is provided at lower speeds with no hunting conditions in the cycle of operation of the torque converter. However, the driver of the vehicle may over-rule this lock-up at any time by simply fully depressing the accelerator pedal 83 which as previously described engages the end of the rod 81 to effect pivotal movement of the lever 76 to shift the accelerator valve 73 so that the detent ball element 92 engages in the groove 95 of the accelerator valve 73, which blocks the delivery of fluid under pressure from the passageway 100 to the passageway 102 and exhausts the fluid passageway 55 and the cylinder for the annular piston 50 to thereby unlock the turbine or rotor and the pump or impeller. If at this time of downshifting, a torque demand exists between the drive and driven shafts there will be a differential of speed between the pump or impeller and the turbine or rotor giving torque multiplication, in the ratio of the differential in the speed between these members. If there is such demand for torque multiplication, the stator will reverse its direction of rotation to take the reaction to the case of the unit and with it revolve the rotary or control valve 110 to the unlocked position previously described thus keeping the converter unlocked to get torque multiplication. From here the cycle is repeated as above described to effect lock-up upon the pump or impeller and the turbine or rotor approaching substantially the same speed. However, on the other hand if torque demand does not exist at the time of a downshift effected by manipulation of the accelerator pedal 83 as last described, there will not be a differential speed between the turbine or rotor and pump or impeller members, and the converter would automatically lock-up again as soon as the accelerator pedal is slightly retracted from its fully depressed position releasing the lever 76 from its engagement with the upper end of accelerator valve 73.

Figure 9:
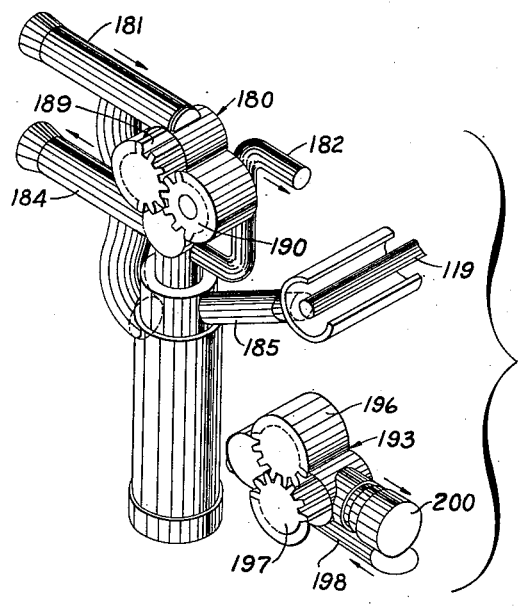
Figure 9 is a schematic perspective view of a pair of fluid pump means associated with the torque converter for supplying fluid under pressure for operation of the same.

In Figure 9 we have illustrated diagrammatically suitable pump means for effecting delivery of fluid under pressure for the control of the accelerator valve 73 and for providing fluid under pressure to effect operation of the torque converter. The pump means of itself forms no part of our present invention and it is believed that the manner in which it is incorporated with the torque converter will be readily apparent to those skilled in the art. Briefly, as shown in Figure 9 a first gear pump 180 is provided for effecting withdrawal of fluid through a conduit 181 from a sump or reservoir (not shown) to effect discharge of the fluid delivered by pump 180 through a conduit 182 extending to the bore 135 in the housing section 70 and providing a source of fluid under pressure for effecting actuation of the clutch means 47 through the means previously described. A second conduit or passageway 184 is adapted to extend to a control means for effecting the automatic control, for example, of a two speed gear transmission (not shown) adapted to have connection with the driven shaft 27. A third conduit or passageway 185 extends to the torque converter 10 for effecting delivery of fluid under pressure providing for torque multiplication through the unit as is well known in the art. As previously related the pinion 38 is caused to be driven with the housing 33 of the torque converter and this pinion has meshing engagement with a gear 187 as shown in Figure 1 and which gear comprises a shank portion 188 to which is keyed one gear 196 of the gear pump 193. The gear 196 has meshing engagement with a gear 197 as shown in Figures 1 and 9, and the pump 193 provides for drawing fluid through a conduit 198 extending into the sump of the transmission, and delivering the fluid through conduit 200 back to the reservoir for containing the fluid for the fluid system for the torque converter. The gear pump 180 also is caused to be driven by the pinion 38 by a gear (not shown) but like above described gear 187 which has meshing engagement with pinion 38 and which has a shank portion to which a gear 189, shown in Figure 9, is keyed. The gear 189 has meshing engagement with gear 190 of gear pump 180, and the gear pump 180 provides for the delivery of fluid under pressure through the conduits 182, 184 and 185 as described. It is believed that the diagrammatic illustration of the pair of pumps for the purposes noted will be readily apparent to those skilled in the art and need not be further described in detail for an understanding of our present invention.

While we have shown what we consider to be the preferred embodiment of our invention it will be understood that various modifications and rearrangements may be made therein without depriving the spirit and scope of our invention.

We claim:

1. In a torque converter comprising pump, turbine and stator elements, the combination of fluid pressure responsive clutch means between said pump and turbine elements adapted to be engaged to clutch the latter together for conjoint rotation, fluid passageway means for conducting fluid under pressure to said clutch means to effect engagement of the latter, accelerator valve means associated with said passageway having a first position for permitting flow of fluid under pressure through the latter, and control valve means associated with said stator element and said passageway normally disposed in a position preventing flow of fluid through said passageway during torque multiplication through said torque converter, and adapted when said pump and turbine elements are rotating at substantially the same speed to permit flow of fluid under pressure through said passageway to said clutch means to effect engagement of the latter when said accelerator valve is in said first position.

2. In a torque converter comprising pump, turbine and stator elements, the combination of fluid pressure responsive clutch means between said pump and turbine elements adapted to be engaged to clutch the latter together for conjoint rotation, first fluid passageway means for conducting fluid under pressure to said clutch means to engage the latter, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said stator element and adapted during torque multiplication through said torque converter to prevent flow of fluid under pressure through said second passageway, said stator element upon diminishing of torque multiplication between said pump and turbine elements so that when the latter are rotating at substantially the same speed being effective to actuate said control valve means to open said second passageway to admit fluid under pressure to said accelerator valve to shift the latter from said first position to said second position, and thereby effect the delivery of fluid under pressure through said first passageway to engage said clutch means.

3. In a torque converter comprising pump, turbine and stator elements, the combination of fluid pressure responsive clutch means between said pump and turbine elements adapted to be engaged to clutch the latter together for conjoint rotation, first fluid passageway means for conducting fluid under pressure to said clutch means to engage the latter, accelerator valve means associated with said first passageway having a first position for preventing flow of fluid under pressure therethrough and a second position for opening the latter, second fluid passageway means for conducting fluid under pressure to said accelerator valve means for shifting the latter from its first position to its said second position, control valve means associated with said first and second passageways having a first position for preventing flow of fluid under pressure through said passageways and a second position for admitting fluid under pressure to said passageways, said control valve means being associated with said stator element and being adapted to be controlled thereby so that upon torque multiplication through said torque converter said control valve means is disposed in said first position thereof and when said pump and turbine elements are rotating at substantially the same speed in said second position, thereof, whereby when said control valve means is in its said second position fluid under pressure is adapted to be admitted to said accelerator valve to shift the same from its said first position to its said second position, and thereby admit fluid under pressure through said first passageway and said control valve to said clutch means to engage the latter.

4. In a torque converter comprising pump, turbine and stator elements, the combination of fluid pressure responsive clutch means between said pump and turbine elements adapted to be engaged to clutch the latter together for conjoint rotation, first fluid passageway means for conducting fluid under pressure to said clutch means to engage the latter, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said first and second passageways having a first position for preventing flow of fluid under pressure through said passageways and a second position for admitting fluid under pressure to said passageways, said control valve means being associated with said stator element and being adapted to be controlled thereby so that upon torque multiplication through said torque converter said control valve means is disposed in said first position thereof and when said pump and turbine elements are rotating at substantially the same speed in said second position, thereof, whereby when said control valve means is in its said second position fluid under pressure is adapted to be admitted to said accelerator valve to shift the same from its said first position to its said second position, and thereby admit fluid under pressure through said first passageway and said control valve to said clutch means to engage the latter, and manually operable means for returning said accelerator valve from its said second position to its said first position.

5. In a torque converter comprising pump, turbine and stator elements, the combination of fluid pressure responsive clutch means between said pump and turbine elements adapted to be engaged to clutch the latter together for conjoint rotation, first fluid passageway means for conducting fluid under pressure to said clutch means to engage the latter, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said first and second passageways having a first position for preventing flow of fluid under pressure through said passageways and a second position for admitting fluid under pressure to said passageways, said control valve means being associated with said stator element and being adapted to be controlled thereby so that upon torque multiplication through said torque converter said control valve means is disposed in said first position thereof and when said pump and turbine elements are rotating at substantially the same speed in said second position, thereof, whereby when said control valve means is in its said second position fluid under pressure is adapted to be admitted to said accelerator valve to shift the same from its said first position to its said second position, and thereby admit fluid under pressure through said first passageway and said control valve to said clutch means to engage the latter, and spring means associated with said control valve means for effecting movement of the same from its said first position to its said second position at a predetermined time prior to said pump and turbine elements reaching substantially the same speed of rotation.

6. In a torque converter comprising pump, turbine and stator elements, the combination of fluid pressure responsive clutch means between said pump and turbine elements adapted to be engaged to clutch the latter together for conjoint rotation, first fluid passageway means for conducting fluid under pressure to said clutch means to engage the latter, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said first and second passageways having a first position for preventing flow of fluid under pressure through said passageways and a second position for admitting fluid under pressure to said passageways, said control valve means being associated with said stator element and being adapted to be controlled thereby so that upon torque multiplication through said torque converter said control valve means is disposed in said first position thereof and when said pump and turbine elements are rotating at substantially the same speed in said second position, thereof, whereby when said control valve means is in its said second position fluid under pressure is adapted to be admitted to said accelerator valve to shift the same from its said first position to its said second position, and thereby admit fluid under pressure through said first passageway and said control valve to said clutch means to engage the latter, detent means associated with said control valve means for yieldingly maintaining the latter in either of its first and second positions, and spring means associated with said control valve means for effecting movement of the same against the force of said detent means from the first position of said control valve means to the second position of the same at predetermined time prior to said pump and turbine elements reaching substantially the same speed of rotation.

7. In a torque converter comprising pump, turbine and stator elements, the combination of fluid pressure responsive clutch means between said pump and turbine elements adapted to be engaged to clutch the latter together for conjoint rotation, first fluid passageway means for conducting fluid under pressure to said clutch means to engage the latter, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said first and second passageways having a first position for preventing flow of fluid under pressure through said passageways and a second position for admitting fluid under pressure to said passageways, said control valve means being associated with said stator element and being adapted to be controlled thereby so that upon torque multiplication through said torque converter said control valve means is disposed in said first position thereof and when said pump and turbine elements are rotating at substantially the same speed in said second position, thereof, whereby when said control valve means is in its said second position fluid under pressure is adapted to be admitted to said accelerator valve to shift the same from its said first position to its said second position, and thereby admit fluid under pressure through said first passageway and said control valve to said clutch means to engage the latter, manually operable means for returning said accelerator valve from its said second position to its said first position, and detent means for yieldingly maintaining said accelerator valve means in either of its first and second positions.

8. In a torque converter comprising pump, turbine and stator elements, the combination of fluid pressure responsive clutch means between said pump and turbine elements adapted to be engaged to clutch the latter together for conjoint rotation, first fluid passageway means for conducting fluid under pressure to said clutch means to engage the latter, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said first and second passageways having a first position for preventing flow of fluid under pressure through said passageways and a second position for admitting fluid under pressure to said passageways, said control valve means being associated with said stator element and being adapted to be controlled thereby so that upon torque multiplication through said torque converter said control valve means is disposed in said first position thereof and when said pump and turbine elements are rotating at substantially the same speed in said second position, thereof, whereby when said control valve means is in its said second position fluid under pressure is adapted to be admitted to said accelerator valve to shift the same from its said first position to its said second position, and thereby admit fluid under pressure through said first passageway and said control valve to said clutch means to engage the latter, manually operable means for returning said accelerator valve from its said second position to its said first position, said accelerator valve upon return thereof to its said first position and upon torque multiplication demand existing between said pump and turbine elements effecting actuation of said control valve means to close said first passageway to prevent admission of fluid under pressure thereto and bleed means associated with said first and second passageways for bleeding fluid under pressure from said accelerator valve and said clutch means.

9. Control means for a torque converter having pump, turbine and stator elements and clutch means between the pump and turbine elements adapted to be engaged by delivery of fluid under pressure thereto for clutching said pump and turbine elements together for conjoint rotation comprising, first fluid passageway means for delivery of fluid under pressure to said clutch means, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said stator element and adapted during torque multiplication through said torque converter to prevent flow of fluid under pressure through said second passageway, said control valve means being adapted substantially upon termination of torque multiplication through said torque converter to be shifted by movement of said stator element to open said second passageway admitting fluid under pressure to said accelerator valve shifting the latter from its said first position to its said second position, and thereby effect the delivery of fluid under pressure through said first passageway to engage said clutch means.

10. Control means for a torque converter having pump, turbine and stator elements and clutch means between the pump and turbine elements adapted to be engaged by delivery of fluid under pressure thereto for clutching said pump and turbine elements together for conjoint rotation comprising, first fluid passageway means for delivering fluid under pressure to said clutch means, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said first and second passageways having a first position for preventing flow of fluid under pressure through said passageways, and a second position for admitting fluid under pressure to said passageways, said control valve means being adapted substantially upon termination of torque multiplication through said torque converter to be shifted by movement of said stator element from its said first position to its said second position, whereby when said control valve means is in its second position fluid under pressure is adapted to be admitted to said accelerator valve to shift the same from its said first position to its said second position, and thereby admit fluid under pressure through said first passageway and said control valve means to said clutch means to engage the latter.

11. Control means for a torque converter having pump, turbine and stator elements and clutch means between the pump and turbine elements adapted to be engaged by delivery of fluid under pressure thereto for clutching said pump and turbine elements together for conjoint rotation comprising, first fluid passageway means for delivery of fluid under pressure to said clutch means, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said stator element and adapted during torque multiplication through said torque converter to prevent flow of fluid under pressure through said second passageway, said control valve means being adapted substantially upon termination of torque multiplication through said torque converter to be shifted by movement of said stator element to open said second passageway admitting fluid under pressure to said accelerator valve shifting the latter from its said first position to its said second position, and thereby effect the delivery of fluid under pressure through said first passageway to engage said clutch means, and manually operable means for returning said accelerator valve from its said second position to its said first position.

12. Control means for a torque converter having pump, turbine and stator elements and clutch means between the pump and turbine elements adapted to be engaged by delivery of fluid under pressure thereto for clutching said pump and turbine elements together for conjoint rotation comprising, first fluid passageway means for delivery of fluid under pressure to said clutch means, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said stator element and adapted during torque multiplication through said torque converter to prevent flow of fluid under pressure through said second passageway, said control valve means being adapted substantially upon termination of torque multiplication through said torque converter to be shifted by movement of said stator element to open said second passageway admitting fluid under pressure to said accelerator valve shifting the latter from its said first position to its said second position, and thereby effect the delivery of fluid under pressure through said first passageway to engage said clutch means, and spring means associated with said control valve means for effecting movement of the same from its said first position to its said second position at a predetermined time prior to termination of torque multiplication through said torque converter.

13. Control means for a torque converter having pump, turbine and stator elements and clutch means between the pump and turbine elements adapted to be engaged by delivery of fluid under pressure thereto for clutching said pump and turbine elements together for conjoint rotation comprising, first fluid passageway means for delivery of fluid under pressure to said clutch means, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said stator element and adapted during torque multiplication through said torque converter to prevent flow of fluid under pressure through said second passageway, said control valve means being adapted substantially upon termination of torque multiplication through said torque converter to be shifted by movement of said stator element to open said second passageway admitting fluid under pressure to said accelerator valve shifting the latter from its said first position to its said second position, and thereby effect the delivery of fluid under pressure through said first passageway to engage said clutch means, detent means associated with said control valve means for yieldingly maintaining the latter in either its said first and second positions, and spring means associated with said control valve means for effecting movement of the same against the force of said detent means from the first position of said control valve means to the second position of the same at a predetermined time prior to termination of torque multiplication through said torque converter.

14. Control means for a torque converter having pump, turbine and stator elements and clutch means between the pump and turbine elements adapted to be engaged by delivery of fluid under pressure thereto for clutching said pump and turbine elements together for conjoint rotation comprising, first fluid passageway means for delivery of fluid under pressure to said clutch means, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said stator element and adapted during torque multiplication through said torque converter to prevent flow of fluid under pressure through said second passageway, said control valve means being adapted substantially upon termination of torque multiplication through said torque converter to be shifted by movement of said stator element to open said second passageway admitting fluid under pressure to said accelerator valve shifting the latter from its said first position to its said second position, and thereby effect the delivery of fluid under pressure through said first passageway to engage said clutch means, manually operable means for returning said accelerator valve from its said second position to its said first position, and detent means for yieldingly maintaining said accelerator valve means in either of its first and second positions.

15. Control means for a torque converter having pump, turbine and stator elements and clutch means between the pump and turbine elements adapted to be engaged by delivery of fluid under pressure thereto for clutching said pump and turbine elements together for conjoint rotation comprising, first fluid passageway means for delivery of fluid under pressure to said clutch means, accelerator valve means associated with said first passageway having a first position for preventing flow of fluid under pressure therethrough and a second position for opening the latter, second fluid passageway means for conducting fluid under pressure to said accelerator valve means for shifting the latter from its said first position to its said second position, control valve means associated with said stator element and adapted during torque multiplication through said torque converter to prevent flow of fluid under pressure through said second passageway, said control valve means being adapted substantially upon termination of torque multiplication through said torque converter to be shifted by movement of said stator element to open said second passageway admitting fluid under pressure to said accelerator valve shifting the latter from its said first position to its said second position, and thereby effect the delivery of fluid under pressure through said first passageway to engage said clutch means, manually operable means for returning said accelerator valve from its said second position to its said first position, said accelerator valve upon return thereof to its said first position and upon torque multiplication demand existing between said pump and turbine elements effecting actuation of said control valve means to close said first passageway to prevent admission of fluid under pressure therethrough to said clutch means, and bleed means associated with said first and second passageways for bleeding fluid under pressure from said accelerator valve and said clutch means.

16. In a torque converter comprising pump, turbine and stator elements, the combination of clutch means between said pump and turbine elements adapted to be engaged to clutch the latter elements together for conjoint rotation, means having connection with said stator element operable by movement of the latter when said pump and turbine are rotating at substantially the same speed to effect engagement of said clutch means, and manually operable means associated with said means having connection with said stator element for effecting disengagement of said clutch means.

17. In a transmission comprising a torque converter having pump, turbine and stator elements, a drive shaft associated with said pump element, a driven shaft associated with said turbine element the combination of clutch means between said pump and turbine elements adapted to be engaged to clutch the latter elements together for conjoint rotation, means connected with said stator element operable by movement of the latter when the torque multiplication between said pump and turbine elements diminishes so that the latter are rotating at substantially the same speed to effect engagement of said clutch means, means operable for preventing disengagement of said clutch means, irrespective of torque demand between said drive and driven shafts, and manually operable means for operating said last-named means from a clutch engaging position to a clutch disengaging position.

HAROLD E. CHURCHILL.
WOODROW A. HASBANY.

REFERENCES CITED

The following references are of record in the file of this patent:

UNITED STATES PATENTS

| Number | Name | Date |
| --- | --- | --- |
| 1,960,705 | Kochling | May 29, 1934 |
| 2,042,189 | Rabe | May 26, 1936 |
| 2,120,896 | Koeppen et al. | June 14, 1938 |
| 2,226,801 | Black | Dec. 31, 1940 |
| 2,226,802 | Black | Dec. 31, 1940 |
| 2,279,019 | Black | Apr. 7, 1942 |
| 2,332,593 | Nutt et al. | Oct. 26, 1943 |
| 2,480,933 | Jandasek | Sept. 6, 1949 |